United States Patent [19]

Kim

[11] Patent Number: 4,563,337

[45] Date of Patent: * Jan. 7, 1986

[54] METHOD AND APPARATUS FOR CONTINUOUS ION EXCHANGE

[75] Inventor: Bang M. Kim, Schenectady, N.Y.

[73] Assignee: General Electric Company, Schenectady, N.Y.

[*] Notice: The portion of the term of this patent subsequent to Apr. 17, 2001 has been disclaimed.

[21] Appl. No.: 407,963

[22] Filed: Aug. 13, 1982

[51] Int. Cl.[4] .................. C01G 3/00; C01G 37/14; B01D 11/00; B01F 1/00
[52] U.S. Cl. ........................ 423/24; 423/54; 423/658.5; 423/8; 423/139; 75/101 BE; 210/275.2; 210/321.2; 210/335; 210/638; 210/644
[58] Field of Search .............. 423/658.5, 24, 54; 75/101 BE; 210/651, 652, 257.2, 321.2, 335, 638, 644

[56] References Cited

U.S. PATENT DOCUMENTS

| | | |
|---|---|---|
| 3,956,112 | 5/1976 | Lee et al. |
| 3,957,504 | 5/1976 | Ho et al. .................. 75/101 BE |
| 4,092,117 | 5/1978 | Byrne .......................... 210/644 |
| 4,360,946 | 12/1981 | Kim ............................... 204/51 |

*Primary Examiner*—Herbert T. Carter
*Attorney, Agent, or Firm*—Lawrence D. Cutter; James C. Davis, Jr.; Marvin Snyder

[57] ABSTRACT

A method of continuous ion exchange for waste water treatment and metal recovery employs two membranes, each disposed in its own fluid-tight chamber. A feed solution containing metal ions is passed in contact with one membrane, the opposite side of which is in contact with a recirculating flow of liquid ion exchange material which receives selected dissolved mineral ions. The liquid ion exchange material is then passed over a second membrane, the other side of which is supplied with an eluant solution for further selective recovery of the desired mineral ion or ions. During recirculation the liquid ion exchange material is preferably passed through an aqueous separator. An apparatus for the practice of the present invention is also disclosed.

16 Claims, 3 Drawing Figures

4,563,337

METHOD AND APPARATUS FOR CONTINUOUS ION EXCHANGE

BACKGROUND OF THE INVENTION

The present invention relates to methods and apparatus for the treatment of metal-containing solutions. More particularly, the present invention relates to a continuous ion exchange method which is particularly useful for the selected concentration and removal of metals from aqueous solutions, either for pollution control or for resource recovery.

In various hydrometallurgical processes, aqueous solutions containing large amounts of dissolved mineral ions such as gold, silver, uranium, cobalt, molybdenum and copper are employed or produced. Additionally, in various plating plants, aqueous solutions containing relatively high concentrations of silver, cadmium, zinc, chromium, and copper result from the processes employed. Such aqueous solutions can be pollutants because of the relatively high levels of metal ions present. However, many of these metals are valuable in their own right and selective extraction of them from the aqueous solutions is usually highly desirable.

In U.S. Pat. No. 4,306,946, issued Dec. 22, 1981 in the name of the instant inventor, Donnan dialysis is employed as a continuous ion exchange process. This process employs a solid ion exchange membrane as a barrier between feed and eluant solutions. However, the method suffers from low removal rate which is determined by the diffusion rate of ions through the solid, ion-exchange membrane. However, it is nonetheless a continuous method and provides many advantages over conventional batch processes which require complex flow schemes and, consequently, a high equipment cost.

Another form of metal recovery process is described in the article "Coupled Transport Membranes" by R. W. Baker et al. in the *Journal of Membrane Science*, Vol. 2, pages 213-233, 1977. The process described therein employs a porous membrane which is impregnated with an organic absorbing medium. However, this process exhibits certain short-comings, particularly membrane instability. Membrane extraction performance deteriorates significantly due to the loss of the organic medium and also due to the filling of the pores with the aqueous solution. This happens when the organic medium is leached out of the pores or pushed out of the pores due to the pressure imbalance across the membrane. The present invention is distinct from the method described in this paper chiefly in that the liquid ion exchange material is not impregnated in a membrane but rather is disposed in a recirculating system between separate membranes in distinct fluid-tight chambers. Accordingly, the problem of the loss of ion exchange material is not present.

Additionally, a process for hydrometallurgical extraction is described in U.S. Pat. No. 3,957,504, issued May 18, 1976 to Ho et al. FIG. 4 of the patent to Ho et al. is particularly relevant in that it illustrates a hydrometallurgical extraction process flow diagram in which a chelating fluid is recycled back to a first ionic membrane extraction unit. However, no provision is made in the apparatus of Ho et al. for treatment of the recycled chelating solutions. In particular, there is no provision for the use of an aqueous/organic separator which the present inventor has found to be particularly effective in selectively isolating and enriching desired metallic species using porous membranes.

SUMMARY OF THE INVENTION

In accordance with a preferred embodiment of the present invention, a method for continuous ion exchange for waste water treatment and metal recovery is disclosed in which a feed solution and liquid ion exchanger are separated by a porous barrier. The liquid ion exchanger absorbs ions from the feed solution by diffusion through the barrier and desorbs them through contact with another membrane which is exposed to an eluant solution. Furthermore, the liquid ion exchanger is processed through an aqueous organic separator to enhance the concentration factor and to increase the removal rate.

In one embodiment of the present invention, a method for a continuous mineral recovery from the feed solution comprises the steps of contacting the feed solution with a first membrane; contacting a liquid ion exchange material with the other side of this membrane, and also with a second membrane, the other side of which is in contact with a flowing eluant solution. The liquid ion exchange solution is circulated between the two membranes and in the process of so doing, is passed through an aqueous extractor.

In another embodiment of the present invention, an apparatus for continuous mineral recovery from a feed solution comprises first, open-loop means for contacting the feed solution with a first side of a first membrane; a second, closed-loop means for circulating a liquid ion exchange material in a continuous loop in contact with the second side of a first membrane and also in contact with the first side of a second membrane, the ion exchange solution being passed through an aqueous extractor; and third, open-loop means for contacting an eluant solution with the second side of the second membrane for the selective extraction of at least one dissolved mineral from the liquid ion exchange material.

An apparatus for continual mineral recovery from the feed solution, in accordance with the present invention, may also comprise a first, fluid-tight chamber having a first membrane disposed therein so as to define first and second volumes; a second, fluid-tight chamber having a second membrane disposed therein so as to define a third and fourth volume; means for providing fluid flow to the third volume from the second volume; means for providing fluid flow from the third volume to the second volume through an aqueous extractor; means for providing fluid flow of the feed solution through the first volume in contact with the first membrane; and, lastly, means for providing fluid flow of an eluant solution through the fourth volume in contact with the second membrane.

Accordingly, it is an object of the present invention to provide a method and apparatus for continuous ion exchange for the purpose of removal of dissolved mineral species from a feed solution.

It is also an object of the present invention to provide an aqueous or aqueous/organic separator for use in continuous ion exchange processes for the purpose of enhancing recovery rates and efficiencies.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
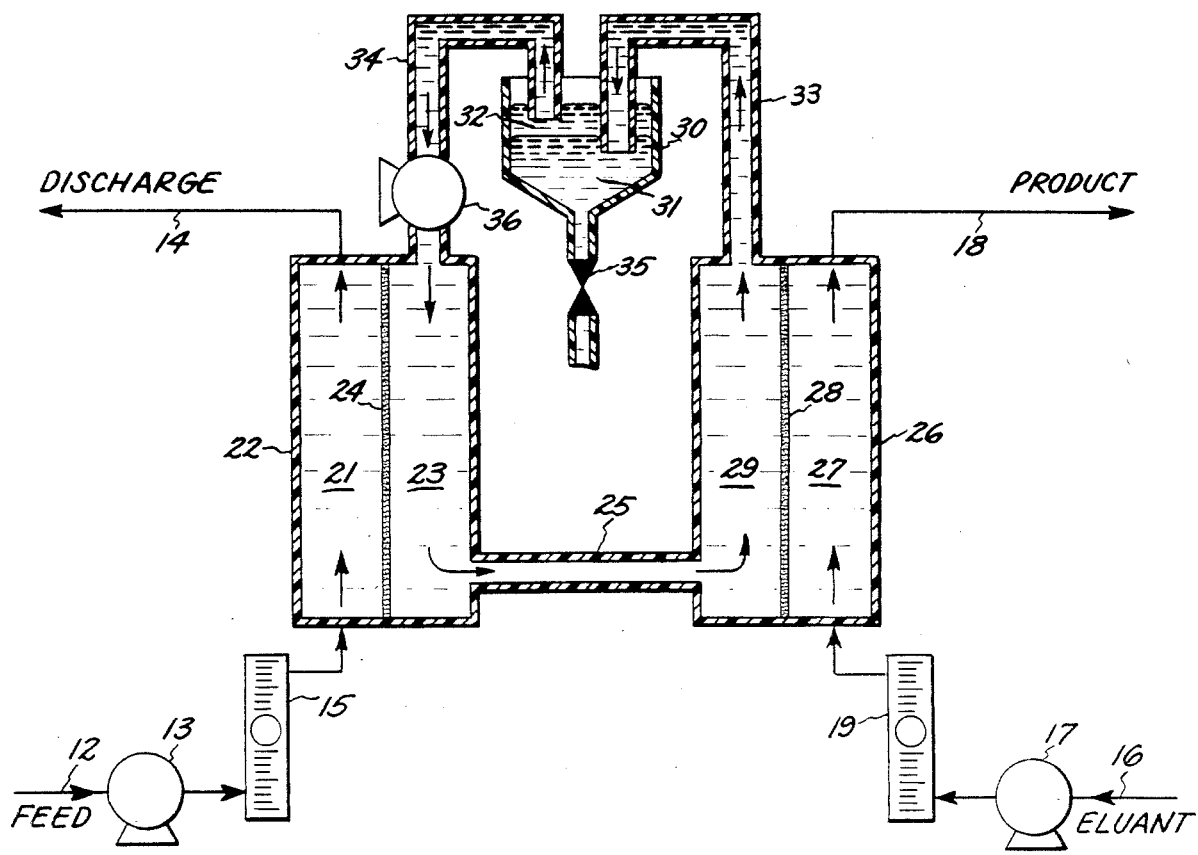
FIG. 1 is a partial cross-sectional side elevation and schematic view illustrating an embodiment of the present invention.

The apparatus shown in FIG. 1 illustrates an embodiment for carrying out the method of the present invention. In particular, there is shown first fluid-tight chamber 22 having membrane 24 disposed therein so as to divide the chamber into volumes 21 and 23, as shown. Chamber 22 is preferably constructed using a nonreactive material such as plastic or a plastic-lined metal container. Feed solution 12 containing dissolved mineral species such as copper, gold, silver, chromium and uranium ions is supplied to volume 21 of chamber 22 by means of pump 13. The rate of solution flow is measured using flow meter 15. Feed solution 12 is passed over and in contact with membrane 24 (described in detail below) and exits volume 21 as discharge 14 which is either treated as waste or as an aqueous solution for further processing, depending upon the mineral compositions in feed solution 12. A liquid ion exchange material is simultaneously circulated through volume 23 which is disposed on the other side of membrane 24 from volume 21 of chamber 22. The liquid ion exchange solution is circulated in a closed loop by means of pump 36. The ion exchange material is selected to absorb the desired product species through membrane 24 by means of a counterbalancing flow of ions such as $H^+$ to discharge solution 14. The liquid ion exchange solution containing the desired dissolved mineral species is circulated through volume 29 in chamber 26 (constructed similarly to chamber 22) so that the solution flows over and in contact with second membrane 28. Volume 27, on the other side of membrane 28 opposite volume 29, contains a circulating flow of eluant solution such as acid, base or salt solution for the desorption of the desired mineral specie or species through membrane 28. The eluant solution 16 is supplied by pump 17 to volume 27 and its rate of flow is measured by flow meter 19. The desired product solution 18 is thus removed from volume 27.

A significant feature of the present invention is the recirculation of liquid ion exchange material from volume 29 back to volume 23 through conduits 33 and 34. It is further significant that an aqueous separator is employed in this closed loop. In particular, it has been found by the present inventor that there is a tendency for water to be present in the liquid ion exchange material to the detriment of the proper operation of the process. There are many causes for the presence of this aqueous solution in the organic liquid ion exchange medium. Aqueous solutions tend to move to the organic phase because of the pressure difference across the membrane. Water droplets also tend to form in the organic phase by saturatior of dissolved water. Water may also be formed in the organic phase by the reaction of absorbed $H^+$ and $H^-$ from the eluant and feed solutions. Even a small amount of aqueous solution trapped in the organic phase (the liquid ion exchange material) significantly deteriorates the performance of the ion exchange system. Accordingly, it has been found, as the graphs in FIGS. 2 and 3 indicate, that the presence of the aqueous/organic separator improves the enrichment factor as well as the rate of metal removal. The aqueous separator may comprise a simple settling container 30 in which the denser aqueous component 31 settles to the bottom of the container and is periodically removed through valve 35. Accordingly, conduit 34 is disposed within container 30 so as to preferentially remove only the de-aquified portion 32 of the contents of container 30.

The aqueous/organic separator and pump 36 may also be located in the position in the flow circuit occupied by conduit 25. If very high enrichment factor is required, two distinct separator units may be employed, one located as shown in FIG. 1 and the second located in the position in the flow circuit occupied by conduit 25.

Figure 2:
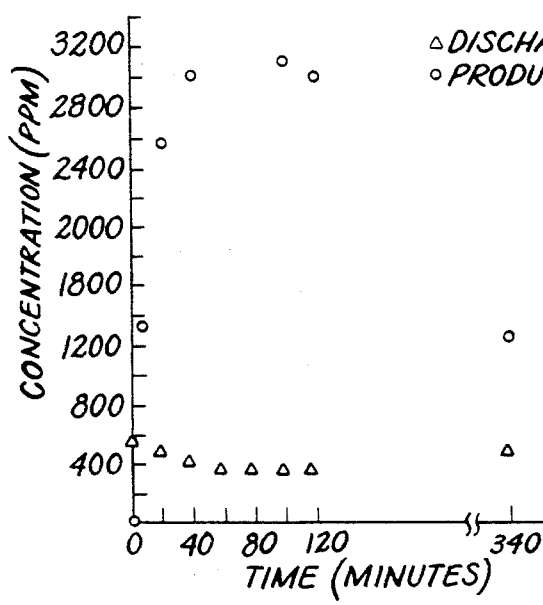
FIG. 2 is a plot of concentration of copper in a treated solution and in the product solution as a function of time without the use of an aqueous/organic separator.

FIG. 2 illustrates the result of experiments conducted using an apparatus similar to that shown in FIG. 1 except that conduits 33 and 34 were connected directly so as not to provide any aqueous extraction from the liquid ion exchange fluid which is recirculated from volume 29 to volume 23. The experiment involved treating 2,000 ml of 0.01 Molar $CuSO_4$ solution by passing it through the membrane extractor. The discharge solution was recycled to the feed container. The eluant solution comprised 200 ml of 2 Molar $H_2SO_4$ solution. The product stream was also recycled to the eluant container. The liquid ion exchange material comprised commercially-available LIX 64N diluted in kerosene. In ideal operation where there is no bulk transport of aqueous solution across the membrane, the copper concentration in the feed container should continuously decrease and reach zero concentration. The copper concentration in the product container should reach a concentration of 0.1 Molar (6,400 ppm), which is 10 times the feed concentration. However, the copper concentration in the feed container began to increase after 60 minutes of operation. The copper concentration in the product stream increased initially but decreased after 60 minutes. It has been determined by the present inventor that this incapability of enrichment/removal is atributable to the increased aqueous content (of the liquid ion exchange material) which carries $H+$ ions across both membranes 24 and 28 without the desired exchange of metal ions. The aqueous portion of the circulating medium is responsible for the transport of $H+$ ions from the eluant solution to the feed solution so as to change the equilibrium condition for the extraction reaction and reduces the loading of metal ions in the liquid ion exchanger.

Figure 3:
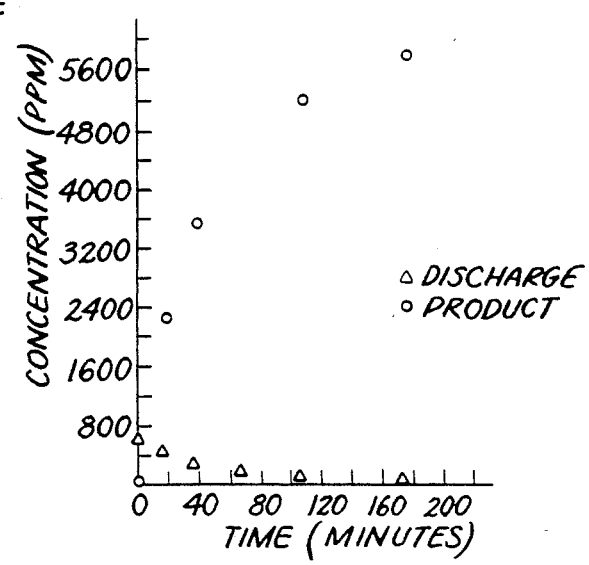
FIG. 3 is a plot similar to FIG. 2 except that an aqueous/organic separator is employed.

FIG. 3 illustrates the result of an experiment similar to the experiment whose results are illustrated in FIG. 2, except that an aqueous/organic separator was employed in the recirculating loop from volume 29 to volume 23. The presence of this additional apparatus resulted in remarkably improved results. This is clearly indicated in FIG. 3 in which it is seen that the concentration of copper ions in the feed container has decreased to a very small value after 180 minutes of processing. It is further seen that the concentration of copper ions in product solution 18 has steadily increased to a level of over 5,600 ppm after 180 minutes of processing. Even after 120 minutes of operation, the concentration of the desired product in solution 18 is significantly greater in the apparatus employing an aqueous-organic separator.

The method and apparatus illustrated in FIG. 1 has been demonstrated to function effectively as a continuous ion separation and enrichment device even if the feed solution contains both copper and iron species, with copper being the desired product. This illustrates one of the several signifcant advantages of the present invention, namely, the ability to employ a large variety of liquid ion exchange materials, each of which may exhibit high selectivity to a specific metal. Such advantages are not found in conventional methods of metal extraction which typically employ solvent extraction in conjunction with a mixer/settler type of operation. Such conventional systems must employ complicated, multi-stage operations to achieve a high enrichment factor. However, the instant apparatus has demonstrated efficiencies in a single contactor (that is, passage of solution through a single column) which are comparable to those previously obtained only through multi-stage enrichment processes. Moreover, conventional methods require stringent control of the level of particulate content in the feed solution for proper operation. However, the continuous ion exchange system of the present invention has been shown to be operable even when feed solutions containing particulate contamination are employed Furthermore, the continuous ion exchange system of the present invention permits a wide choice of organic solvents to be used as liquid ion exchange solution constituents.

With respect to membranes 24 and 28, it is desirable that the pore sizes and the properties of the membranes be chosen so that high molecular weight liquid ion exchanger molecules are not permeable through it but that the desired ions are so permeable. Examples of such membranes are those used for reverse osmosis, dialysis and ultrafiltration. The membrane may also be selected to particularly function to separate aqueous and organic phases. The membrane may be a flat sheet or may comprise a hollow fiber type of membrane. However, the hollow fiber type of membrane is preferred since it exhibits a large contact surface area. The liquid ion exchanger absorbs ions from the feed solution by diffusion through the membrane and is continuously fed to another contactor in a second chamber. Eluants such as acids, bases and salt solutions desorb ions from the liquid ion exchange material and concentrate them in the product stream.

For the recovery of anions such as chromate ions, anion exchange materials such as Alamine 336 ® and Aliquat 336 ®, as supplied by the Henkel Corporation, and Amberlite LA-1 and LA-2, supplied by Rohm and Haas Company, may be employed. In such a case, sodium hydroxide or sodium chloride may be used as eluant solutions. For recovery of cations such as copper, cation exchangers such as LIX 64N and LIX 70 as supplied by the Henkel Corporation, may be used. In this case, acids such as $H_2SO_4$, $HNO_3$ and $HCl$ may be used as eluant solutions.

Table 1 further indicates the effectiveness of the methods and apparatus of the present invention. In particular, the experiment illustrated therein involved copper enrichment using LIX 64N as a liquid ion exchange solution. The eluant solution comprised a 2 Molar solution of sulfuric acid and the membrane or contactor comprised a 3.6 m² hollow fiber membrane. The flow rates are indicated in milliliters per minute and the third column indicates the ratio of the flow rates for the feed solution and the eluant solution. The concentrations of copper are indicated in columns 4 and 5 in units of grams per liter. The ratio of the concentration is indicated in column 6. In particular, column 6 indicates the concentration ratio between the product solution and the feed solution. The results indicated in Table 1 clearly indicate the ability of the present system to remove copper from the feed solution and to concentrate copper in the product solution.

TABLE 1

| COPPER ENRICHMENT | | | | | |
|---|---|---|---|---|---|
| FLOW | | | CONCENTRATION | | |
| FEED (ML/MIN) | ELUANT (ML/MIN) | FEED/ ELUANT | FEED/ (G/L) | PROD./ (G/L) | PROD./ FEED |
| 40 | 2 | 20 | 0.61 | 12.2 | 20 |
| 80 | 4 | 20 | 0.59 | 11.1 | 18.5 |
| 80 | 2 | 40 | 0.62 | 23.5* | 38.9 |

*COPPER TRANSFER RATE: 2.8 G/HR

From the above, it should be appreciated that the methods and apparatus of the present invention provide an improved system for the concentration of metals and minerals from hydrometallurgical and various other wastewater treatment operations involving solutions containing metal ions. It is further seen that the aqueous/organic separator of the present invention provides improved separation capabilities in an effective and economical fashion without deleteriously effecting any other system performance variables. It is further seen that the present invention is applicable to the extraction and concentration of such mineral values as gold, silver, uranium, copper, chromium, molybdenum, cobalt, and tungsten, to name but a few.

Although the system has been described for removal of metal anions, the principle works with any inorganic or organic ion species. Some examples of non-metallic ions are $SO_4^{--}$, $S^{--}$, $PO_---$, $Cl^-$ and $NO_3^-$.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for continuous recovery of selected metal ions from an aqueous solution containing at least one metal ion species, said method comprising the steps of:

contacting said metal ion containing solution with a first side of a first membrane disposed in a first chamber;

contacting the second side of said first membrane in said first chamber with an organic liquid ion exchange material for selective extraction of at least one of said metal ion species from said metal ion containing solution said liquid ion exchange material being chosen to selectively extract at least one metal ion specie from said aqueous solution;

circulating said liquid ion exchange material that has been in contact with said second side of said first membrane in said first chamber, so as to contact a first side of a second membrane disposed in a second chamber with said circulating liquid ion exchange material;

passing the liquid ion exchange material that has been in contact with the first side of said second membrane through aqueous separation means for removal of water from said liquid ion exchange material;

recirculating the treated liquid ion exchange material from said separator so as to recontact the second side of said first membrane in said first chamber; and passing an eluant solution in contact with the second side of said second membrane so as to selectively extract at least one of said metal ion species, said eluant being chosen to selectively extract at least one of said metal ion species, extract at least one metal ion specie from in said liquid ion exchange material.

2. The method of claim 1 in which said first and second membranes are selected from the group consisting of porous reverse osmosis membranes, dialysis membranes and ultrafiltration membranes.

3. An apparatus for continuous metallic ion recovery from an aqueous metallic ion containing solution, said apparatus comprising:

first, open-loop means for contacting said metallic ion containing solution with a first side of a first membrane;

second, closed-loop means for circulating an organic liquid ion exchange material in a continuous loop, in contact with a second side of said first membrane, in contact with a first side of a second membrane, and through aqueous separation means; and third, open-loop means for contacting an eluant solution with a second side of said second membrane for selective extraction of said at least one metallic ion species from said liquid ion exchange material.

4. The apparatus of claim 3 in which said aqueous separation means comprises a settling container.

5. The apparatus of claim 3 further including second aqueous separation means within said second loop.

6. The apparatus of claim 3 in which said first and second membranes are selected from the group consisting of porous reverse osmosis membranes, dialysis membranes and ultrafiltration membranes.

7. The apparatus of claim 3 in which said membranes function to separate aqueous and organic phases.

8. The method of claim 1 in which said eluant comprises material selected from the group consisting of $H_2SO_4$, $HNO_3$ and HCl.

9. The method of claim 1 in which said metallic ion species comprises copper.

10. The method of claim 1 in which said metallic ion species comprises chromate ions.

11. The method of claim 10 in which said eluant solution comprises material selected from the group consisting of NaOH and NaCl.

12. An apparatus for continuous metallic ion recovery from an aqueous metallic ion containing solution comprising:

a first fluid-tight chamber having a first membrane disposed therein so as to define a first and second volume within said first chamber;

a second fluid-tight chamber having a second membrane disposed therein so as to define a third and fourth volume within said second fluid-tight chamber;

a fluid flow path to said third volume from said second volume;

a fluid flow path from said third volume to said second volume;

aqueous separation means disposed either in the flow path from said third volume to said second volume or in the flow path from said second volume to said third volume;

means for providing flow of said metallic ion containing solution through said first volume in contact with said first membrane; and means for providing fluid flow of an eluant solution through said fourth volume in contact with said second membrane.

13. The apparatus of claim 12 in which said aqueous separation means comprises a settling container.

14. The apparatus of claim 12 in which said first and second membranes are selected from the group consisting of porous reverse osmosis membranes, dialysis membranes and ultrafiltration membranes.

15. The apparatus of claim 12 in which said membranes function to separate aqueous from organic phases.

16. The apparatus of claim 12 in which aqueous separation means are disposed in the fluid flow path from said third volume to said second volume and also in the flow path from said second volume to said third volume.

* * * * *